United States Patent [19]
Dehmel et al.

[11] 3,971,741
[45] July 27, 1976

[54] WATER-INSOLUBLE POLYAZO DYESTUFF COMPRISING TWO OR THREE IDENTICAL AZO DYESTUFFS JOINED TO A CENTRAL NUCLEUS BY CARBOXYL BRIDGES

[75] Inventors: Georg Dehmel; Johannes Blahak, both of Cologne-Buchheim, Germany

[73] Assignee: Bayer Aktiengesellschaft, Leverkusen, Germany

[22] Filed: July 9, 1974

[21] Appl. No.: 486,742

Related U.S. Application Data
[63] Continuation of Ser. No. 276,027, July 28, 1972, abandoned.

[30] Foreign Application Priority Data
July 29, 1971   Germany............................ 2138014
Apr. 18, 1972   Germany............................ 2218645

[52] U.S. Cl................................. 260/173; 106/23; 106/288 Q; 106/300; 260/37 R; 260/37 N; 260/37 PC; 260/40 R; 260/42.21; 260/152; 260/154; 260/157; 260/159; 260/160; 260/162; 260/163; 260/169; 260/176; 260/207; 260/207.1; 428/411; 428/412; 428/423; 428/474; 428/480; 428/492; 428/500

[51] Int. Cl.²................ C09B 35/14; C09B 35/36; C09B 43/12; D06P 1/10

[58] Field of Search..................... 260/176, 169, 173

[56] References Cited
UNITED STATES PATENTS

| | | | |
|---|---|---|---|
| 2,286,391 | 6/1942 | Sparks | 260/154 |
| 2,544,087 | 3/1951 | Hindermann | 260/176 X |
| 2,554,141 | 5/1951 | Flory et al. | 260/144 |
| 2,612,496 | 9/1952 | Gaspar et al. | 260/166 |
| 2,773,055 | 12/1956 | Hindermann et al. | 260/163 |
| 2,888,452 | 5/1959 | Schmid et al. | 260/176 X |
| 3,211,717 | 10/1965 | Thomas | 260/160 |
| 3,342,801 | 9/1967 | Illy | 260/162 |
| 3,663,530 | 5/1972 | Leroy et al. | 260/163 |

*Primary Examiner*—Floyd D. Higel
*Attorney, Agent, or Firm*—Plumley and Tyner

[57] ABSTRACT

Waterinsoluble polyazo dyestuffs of the formula $$X(O-OC-D-N=N-K)_m$$

in which K denotes identical or different radicals of a coupling component, X denotes an aliphatic radical which is free of hydroxyl groups and is optionally interrupted by heteroatoms, or an aromatic-carbocyclic, aromatic-heterocyclic or araliphatic radical, D represents an aromatic-carbocyclic or aromatic-heterocyclic radical and $m$ represents the numbers 2 or 3. These dyestuffs are useful as dispersion dyestuffs for coloring synthetic fibers and most especially as pigment dyestuffs for coloring paint, inks, paper, and macromolecular substances and for admixing with other substances such as inorganic white pigments including titanium dioxide.

1 Claim, No Drawings

WATER-INSOLUBLE POLYAZO DYESTUFF COMPRISING TWO OR THREE IDENTICAL AZO DYESTUFFS JOINED TO A CENTRAL NUCLEUS BY CARBOXYL BRIDGES

This is a continuation of application, Ser. No. 276,027 filed July 28, 1972, and now abandoned.

The subject of the present invention are water-insoluble polyazo dyestuffs of the formula $$X(O-OC-D-N=N-K)_m \qquad I.$$

in which

K denotes identical or different radicals of a coupling component,

X denotes an aliphatic radical which is free of hydroxyl groups and is optionally interrupted by heteroatoms, or an aromatic-carbocyclic, aromatic-heterocyclic or araliphatic radical, D represents an aromatic carbocyclic or aromatic heterocyclic radical and m represents the numbers 2 or 3, as well as their manufacture and use.

Suitable radicals K are, for example, radicals of coupling components of the benzene, naphthalene, acylacetic acid amide, pyrazolone, aminopyrazole, pyridine, quinoline and pyrimidine series. Preferred radicals K are 2-hydroxynaphthalene-3-carboxylic acid arylamide, acetoacetic acid arylamide, 1-aryl-5-pyrazolone or 1-alkyl-5-pyrazolone radicals which optionally have one to three substituents in the particular aryl radical, with particularly preferred substituents in the aryl radical — preferably phenyl radical — being alkyl, alkoxy, alkylsulphamyl and alkylsulphonyl groups, each with 1 to 4 C atoms, alkylcarbonylamino and alkoxy-carbonylamino groups, each with 2 to 5 C atoms, halogen atoms such as fluorine, chlorine and bromine, phenoxy, phenylsulphonyl and phenylsulphamyl groups, phenylcarbonylamino groups optionally substituted by halogen, $C_1$ to $C_2$-alkyl and $C_1$ to $C_2$-alkoxy, and nitrile, nitro, carbamyl, phenylcarbamyl and trifluoromethyl groups.

Possible radicals X are the bridge members described in U.S. Pat. No. 3,467,643.

Suitable radicals X free of hydroxyl groups are, for example, straight-chain or branched, saturated or unsaturated, 2-valent or 3-valent aliphatic radicals with 2 or 3 to 18 C atoms, which can preferably be interrupted by $-O-$, $-S-$, $-NH-$, $=N$-Alkyl or $-N<$ , as well as cycloalkylene radicals with 5–7 C atoms.

As examples there may be mentioned:

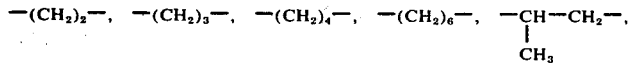

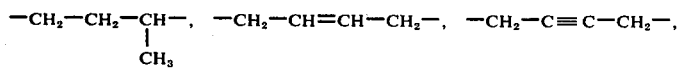

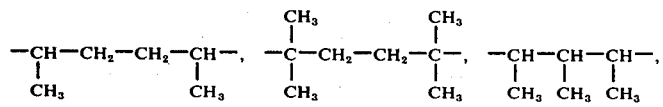

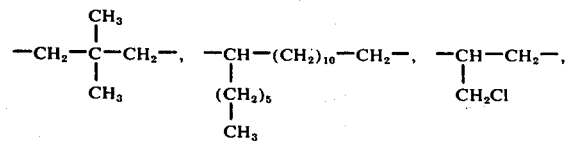

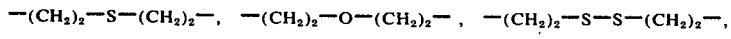

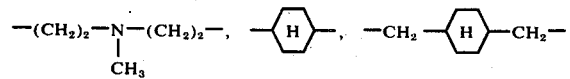

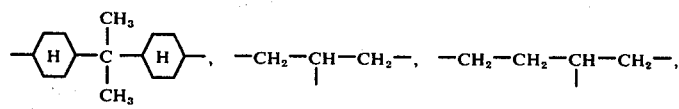

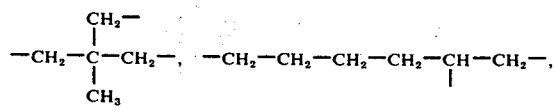

-continued

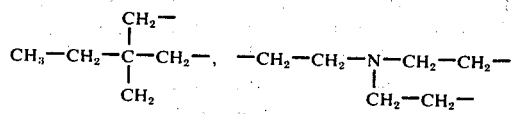

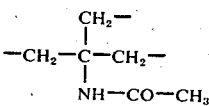

Suitable aromatic-carbocyclic radicals X are preferably phenylene, diphenylene and naphthylene radicals which can contain halogen atoms, such as chlorine and bromine, alkyl and alkoxy groups with 1 to 2 C atoms, nitrile, nitro and trifluoromethyl groups and other substituents customary in dyestuff chemistry.

As examples there may be mentioned:

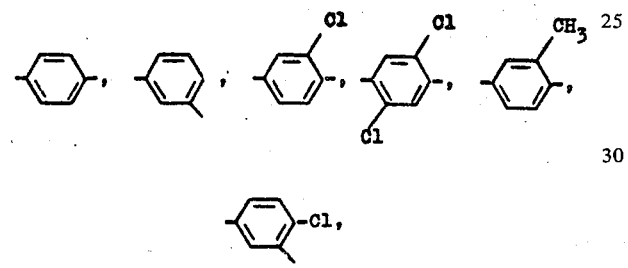

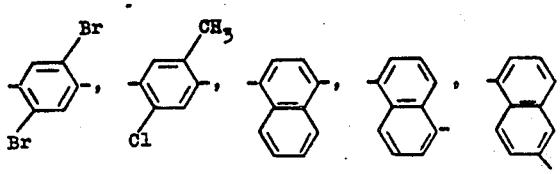

Suitable araliphatic radicals X are preferably alkylenephenylenealkylene or phenylenealkylenephenylene radicals with 1 to 4 C atoms in the alkylene chain.

As examples there may be mentioned:

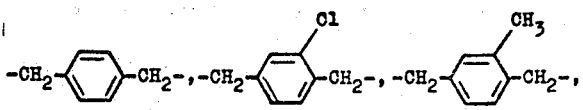

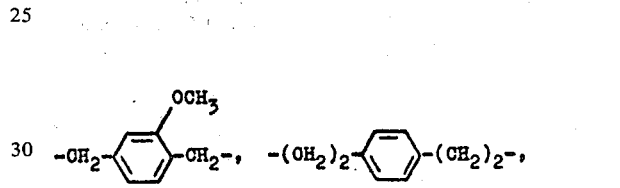

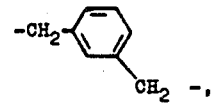

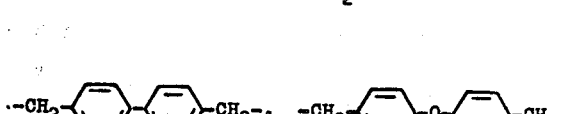

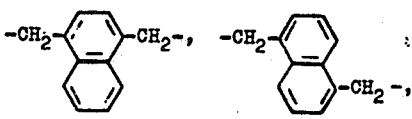

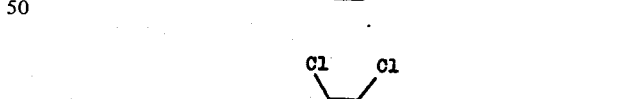

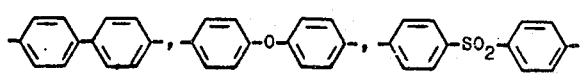

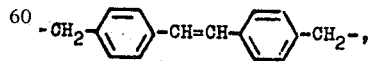

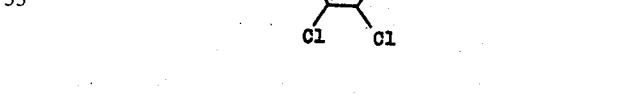

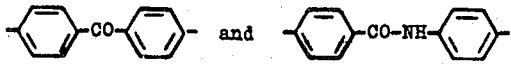 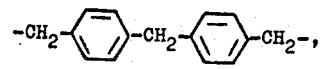

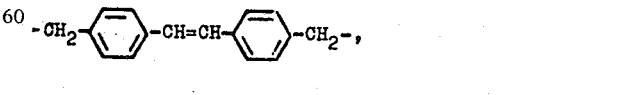

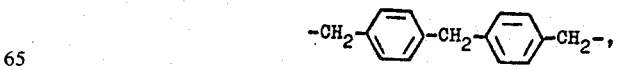

-continued

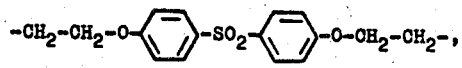

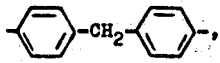

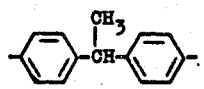 and 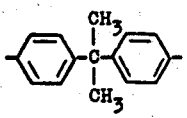

Suitable heterocyclic radicals X are, for example:

 and 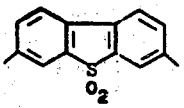

Suitable aromatic-carbocyclic radicals D are phenylene, naphthylene and anthracenylene radicals which are substituted by halogen, such as fluorine, chlorine and bromine, alkyl, alkoxy and alkylsulphamyl groups each with 1 to 4 C atoms, alkylcarbonyl, alkylcarbonyloxy, alkoxycarbonyl and alkylcarbonylamino groups with 2–5 C atoms, phenoxy, sulphamyl, phenylsulphamyl, carbamyl, phenylcarbamyl, phenylcarbonylamino, CN—, $CF_3$— and $NO_2$— groups.

Within the scope of the formula (I), compounds to be viewed as preferred are those which correspond to the formula

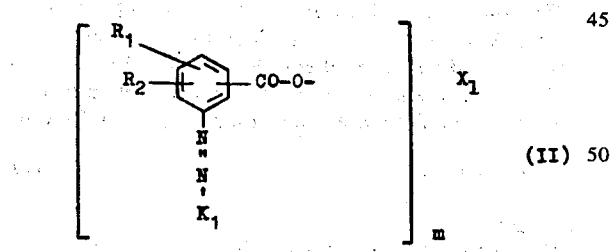

(II)

in which $X_1$ represents a divalent or trivalent aliphatic radical with 2 or 3 to 18 C atoms which is free of hydroxyl groups and optionally interrupted by —O—, —S— or -H<, a phenylene, naphthylene or diphenylene radical which is optionally substituted by chlorine or methyl, or the radical

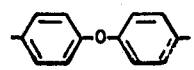

$K_1$ represents the radical of a coupling component of the 2-hydroxynaphthalene-3-carboxylic acid arylamide, acetoacetic acid arylamido or 1-aryl-5-pyrazolone series, $R_1$ and $R_2$ represent hydrogen or alkyl, alkoxy or alkylsulphamyl groups each with 1 to 4 C atoms, alkylcarbonylamino, alkoxycarbonyl or alkylcarbamyl groups each with 2 to 5 C atoms, halogen atoms or nitro, phenoxy, nitrile, trifluoromethyl, phenylcarbonylamino, carbamyl, phenylcarbamyl and phenylsulphamyl groups, it also being possible for $R_1$ and $R_2$ to represent the remaining members of a fused benzene radical, and $m$ denotes the numbers 2 or 3.

Amongst the compounds of the formula (II), those of the formula

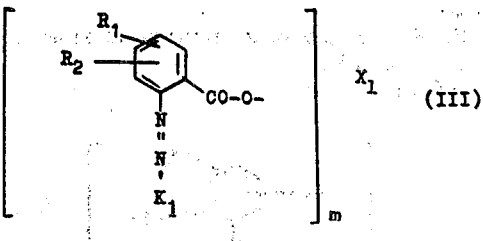

(III)

wherein $X_1$, $K_1$, $R_1$, $R_2$ and $m$ have the meaning indicated in the formula (II) are to be singled out as being particularly suitable.

In turn, within the scope of the formula III, those dyestuffs are preferred which correspond to the formula

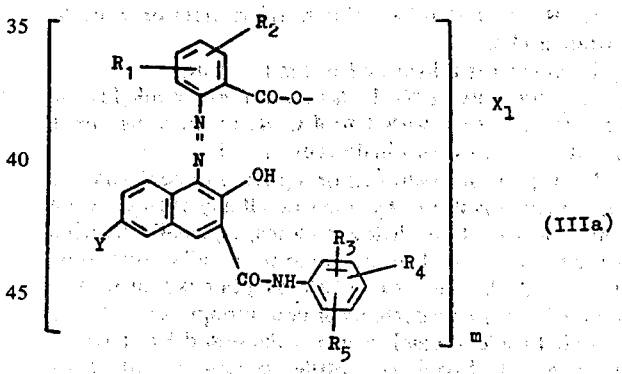

(IIIa)

in which $X_1$, $R_1$, $R_2$ and $m$ have the meaning mentioned in the formula (II), $R_3$ and $R_4$ denote hydrogen, an alkyl or alkoxy radical with 1 to 4 C atoms each, a halogen atom, especially chlorine or bromine, an alkylcarbonylamino or alkoxycarbonyl radical each with 2 to 5 C atoms, a phenoxy, nitro, nitrile, trifluoromethyl or carbamyl radical or a phenylcarbonylamino, phenyloxamido or phenylcarbamyl radical which is optionally substituted by chlorine, bromine $C_1$— to $C_2$-alkyl or $C_1$— to $C_2$-alkoxy radicals, it also being possible for $R_3$ and $R_4$ to form the remaining members of a fused ring, preferably of a benzene ring, $R_5$ represents hydrogen, chlorine, bromine or an alkyl or alkoxy radical with 1 to 2 C atoms each and Y represents hydrogen, chlorine, bromine, an alkoxy radical with 1 to 2 C atoms, a nitrile or a nitro group, or of the formula

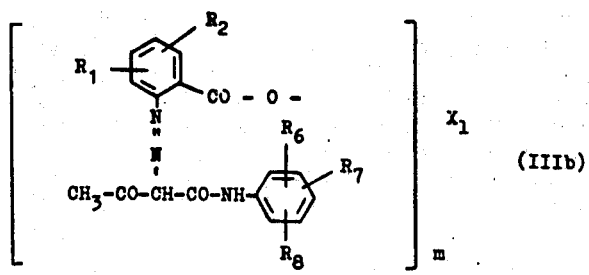

in which

R₁, R₂, X₁ and m have the abovementioned meaning and

R₆, R₇ and R₈ have the same meaning as the radicals R₃, R₄ and R₅ or of the formula

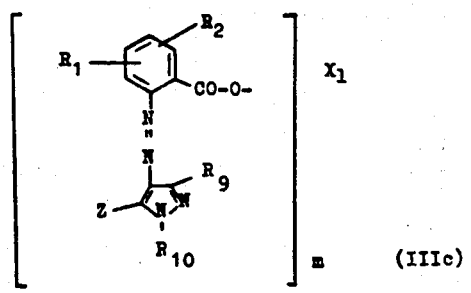

in which

R₁, R₂, X₁ and m have the meaning mentioned in the formula (II),

Z represents a hydroxyl or amino group,

R₉ represents an alkyl, alkoxycarbonyl or alkylcarbamyl radical, each with 1 to 4 C atoms, or a carbamyl, phenyl-carbamyl or nitrile radical and R₁₀ represents hydrogen or a phenyl radical which is optionally sustituted by alkyl or alkoxy radicals each with 1 to 4 C atoms, halogen atoms, especially chlorine or bromine, alkylcarbonylamino or alkoxycarbonyl radicals each with 2 to 5 C atoms, phenoxy, nitro, sulphamyl or phenylcarbonylamino groups, or a C₁ to C₆-alkyl radical which can be substituted by chlorine, bromine, hydroxyl or nitrile groups or alkylcarbonyloxy, alkylcarbonylamino and alkoxycarbonyl groups with 2 to 5 C atoms. The new dyestuffs of the formula (I) are obtained when a. about 1 mol of an amine of the formula

 IV.

which has been diazotised m-fold is combined with m mols of coupling components of the formula

K — H     V.

or b. m mols of dyestuff-carboxylic acid halide of the formula

K—N=N—D—CO—Halogen    VI.

are condensed with about 1 mol of a hydroxy compound of the formula

X ( — OH )ₘ     VII.

In the formulae (IV) to (VII), D, X, K and m, where they form a component of the particular formula, have the meaning mentioned in the formula (I). Halogen in the formula (VI) preferably represents chlorine or bromine.

Suitable dihydroxy and trihydroxy compounds (VII) are, for example: ethanediol-(1,2), propanediol-(1,3), butanediol-(1,4), hexanediol-(1,6), propanediol-(1,2), butanediol-(1,3), butene-(2)-diol-(1,4), butine-(2)-diol(1,4), hexanediol-(2,5), 2,5-dimethylhexanediol-(2,5), 3-methylpentanediol-(2,4), 2,2-dimethylpropanediol-(1,3) octadecanediol-(1,12), 1-chloroproanediol-(1,2), 2,2'-dihydroxydiethyl sulphide, 2,2'-dihydroxydiethyl-ether, triethylene glycol, 2,2'-dihydroxydiethyl disulphide, N-methyl-diethanolamine, cyclohexanediol-(1,4), 1,4-bis-hydroxymethylcyclohexane, 4,4'-dihydroxy-dicyclohexyl-dimethylmethane, bis-hydroxymethylbenzenes, 4,4'-bis-hydroxymethyl-biphenyls or 4,4'-bis-hydroxymethyl-diphenylethers which are optionally substituted by halogen, such as chlorine or bromine, nitro groups lower alkoxy or alkyl radicals, 1,4 and 1,5-bis-hydroxymethylnaphthalene, 1,4-bis-hydroxymethyl-2,3,5,6-tetrachlorobenzene, 4,4'-bis-hydroxymethylstilbene, 1,4-bis-(2'-hydroxyethoxy)-benzene, 4,4'-bis-(2'-hydroxy-ethoxy)-diphenylsulphone, 1,3- or 1,4-dihydroxybenzenes, 4,4'-dihydroxybiphenyls or bis-4hydroxyphenylmethanes which are optionally substituted by halogen, such as chlorine or bromine, nitro, acylamino, alkoxy, alkyl, nitrile or trifluoromethyl radicals, for example 1,3- and 1,4-dihydroxybenzene, 4-chloro-1,3-dihydroxybenzene, 2,3,5,6-tetrachloro-1,4-dihydroxybenzene, 2,5-dibromo-1,4-dihydroxybenzene, 4,4'-dihydroxybiphenyl, 4,4'-dihydroxy-diphenylmethylmethane, 2,2-bis-(4'-hydroxyphenyl)propane and 2,2-bis-(3,5-dichloro-4-hydroxy-phenyl)propane, dihydroxynaphthalenes, for example 1,4-, 1,5- and 1,6-dihydroxynaphthalene, and also propanetriol-(1,2,5), butanetriol-(1,2,4), 1,1,1-trishydroxymethylethane, hexanetriol-(1,2,6), 1,1,1-trishydroxymethylpropane, tris-(2-hydroxyethyl)-amine, tris-(2-hydroxypropyl)-amine, N-acetyl-2-amino-2-hydroxymethyl-propanediol-(1,3) and 1,3,5-trihydroxybenzene.

The diamines and triamines of the formula (IV) are in part known. They are obtained in accordance with processes which are in themselves known, for example either by reaction of 2 or 3 mols of a suitable nitrocarboxylic acid halide, preferably chloride, of the formula D₂N—D—COHal     VIII.

wherein

D has the abovementioned meaning with 1 mol of dihydroxy or trihydroxy compound and subsequent catalytic reduction of the nitro groups or by base-catalysed reaction of compounds of the formula

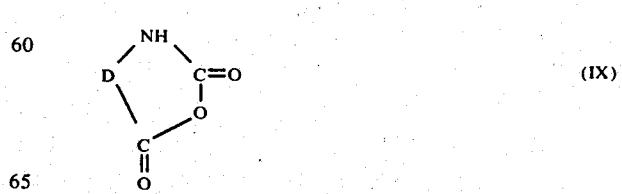

with dihydroxy or trihydroxy compounds of the formula (VII), as described, for example, in J. Org. Chem.; 24, 1214 (1959). The compounds of the formula (IX) are advantageously obtained by phosgenation of suitable o-aminocarboxylic acids. Compare, for example (Houben-Weyl, "Methoden der org. Chemie" ("Methods of Organic Chemistry"), Volume VIII page 112 and "Organic Syntheses" Col. Vol. III p. 488). In some cases the acid-catalysed esterification or transesterification of appropriate aminocarboxylic acids with aliphatic dihydroxy or trihydroxy compounds (VII) in the molar ratio of 2:1 or 3:1, respectively, also proves possible.

Suitable nitrocarboxylic acid halides (VIII) are, for example: 2-nitrobenzoic acid chloride, 2-nitro-4-chlorobenzoic acid chloride, 2,4-dinitrobenzoic acid chloride, 2-nitro-5-methylbenzoic acid chloride, 2-nitro-4-trifluoromethylbenzoic acid chloride, 2-nitro-4-methoxybenzoic acid chloride, 2-nitro-4-ethoxycarbonylbenzoic acid chloride, 2-nitro-4-carbamyl-benzoic acid chloride, 2-nitro-5-acetylaminobenzoic acid chloride, 2-nitro-5-benzoylammobenzoic acid chloride, 2-nitro-4-sulphamyl-benzoic acid chloride, 1-nitro-anthraquinone-2-carboxylic acid chloride, 3-nitrobenzoic acid chloride, 3-nitro-4-chlorobenzoic acid chloride, 3-nitro-4-methylbenzoic acid chloride, 3-nitro-4,6-dimethylbenzoic acid chloride, 3-nitro-6-chlorobenzoic acid chloride, 3-nitro-4,6-dichlorobenzoic acid chloride, 3-nitro-4-methoxybenzoic acid chloride, 3,5-dinitrobenzoic acid chloride, 3-nitro-4-ethoxybenzoic acid chloride, 3-nitro-4-phenoxybenzoic acid chloride, 3-nitro-4-(4'-chlorophenoxy)-benzoic acid chloride, 3-nitro-4-ethoxycarbonylbenzoic acid chloride, 3-nitro-4-methoxy-6-chlorobenzoic acid chloride, 3-nitro-5-phenylcarbonylaminobenzoic acid chloride, 4-nitrobenzoic acid chloride, 3,4-dinitrobenzoic acid chloride, 3-methyl-4-nitrobenzoic acid chloride, and 2-nitronaphthalene-6-carboxylic acid chloride.

Suitable o-aminocarboxylic acids which can be phosgenated to give compounds (IX) are, for example: 2-aminobenzoic acid, 4-chloro-2-aminobenzoic acid, 5-chloro-2-aminobenzoic acid, 6-chloro-2-aminobenzoic acid, 3,5-dichloro-2-aminobenzoic acid, 4,6-dichloro-2-aminobenzoic acid, 5-bromo-2-aminobenzoic acid, 3,5-dibromo-2-aminobenzoic acid, 4-nitro-2-aminobenzoic acid, 5-nitro-2-aminobenzoic acid, 4-methyl-2-aminobenzoic acid, 5-methyl-2-aminobenzoic acid, 6-methyl-2-aminobenzoic acid, 4-trifluoromethyl-2-aminobenzoic acid, 4-methoxy-2-aminobenzoic acid, 4-methoxycarbonyl-2aminobenzoic acid, 4-ethoxycarbonyl-2-aminobenzoic acid, 4-carbamyl-2-aminobenzoic acid, 4-(4'-chlorophenylcarbamyl)-2-aminobenzoic acid, 4-acetylamino-2-aminobenzoic acid, 4-propionylamino-2-aminobenzoic acid, 4-benzoylamino-2-aminobenzoic acid, 4-(2',5'-dichlorobenzoylamino)-2-aminobenzoic acid, 5-acetylamino-2-aminobenzoic acid, 5-benzoylamino-2-aminobenzoic acid, 4-sulphamyl-2-aminobenzoic acid, 4-phenylsulphamyl-2-aminobenzoic acid, 2-aminonaphthalene-3-carboxylic acid and 1-aminoanthraquinone-2-carboxylic acid.

Particularly suitable coupling components which can be used are:

α. from the series of the 2,3-hydroxynapthalenecarboxylic acid arylamides: 2-hydroxy-3-napthoic acid anilide, 2-hydroxy-3-naphthoic acid (2'-methyl)-anilide, 2-hydroxy-3-naphthoic acid (4'-methyl)-anilide, 2-hydroxy-3-naphthoic acid (2'-methoxy)-anilide, 2-hydroxy-3-naphthoic acid (2',5'-dimethoxy)-anilide, 2-hydroxy-3-naphthoic acid (4'-methoxy)-anilide, 2-hydroxy-3-naphthoic acid (3'-nitro)anilide, 2-hydroxy-3-naphthoic acid (2'-chloro)-anilide, 2-hydroxy-3-naphthoic acid (3'-trifluoromethyl)-anilide, 2-hydroxy-3-naphthoic acid (4'-fluoro)-anilide, 2-hydroxy-3-naphthoic acid (4'-chloro)-anilide, 2-hydroxy-3-naphthoic acid (2',4'-dimethyl)-anilide, 2-hydroxy-3-naphthoic acid (2'-methyl-5'-chloro)-anilide, 2-hydroxy-3-naphthoic acid (2'-methyl-4'-chloro)-anilide, 2-hydroxy-3-naphthoic acid (2',5'-dimethoxy-4'-chloro)-anilide, 2-hydroxy-3-naphthoic acid (2',4'-dimethoxy-5'-chloro)-anilide, 2-hydroxy-3-naphthoic acid (2'-methyl-4'-methoxy)-anilide, 2-hydroxy-3-naphthoic acid (2'-methoxy-5'-chloro)-anilide, 2-hydroxy-3-naphthoic acid (4'-methoxy-2'-chloro)-anilide, 2-hydroxy-3-naphthoic acid (2'-methyl-3'-chloro)-anilide, 2-hydroxy-3-naphthoic acid (naphthyl-(1'))-amide, 2-hydroxy-3-naphthoic acid (naphthyl-(2'))-amide, 2-hydroxy-3-naphthoic acid (2'-ethoxy)-anilide, 2-hydroxy-3-naphthoic acid (4'-ethoxy)anilide, 2-hydroxy-3-naphthoic acid (2'-methoxy-5'-methyl)anilide, 2-hydroxy-3-naphthoic acid (4'-acetylamino)-anilide, 2-hydroxy-3-naphthoic acid (2',5'-dichloro)-anilide, 2-hydroxy-naphthoic acid (4'-acetylamino-2',5'-dichloro)-anilide, 2-hydroxy-3-naphthoic acid (2'-methoxy-4'-methyl)-anilide, 2-hydroxy-3-naphthoic acid (2',4'-diethoxy)-anilide, 2-hydroxy-3-naphthoic acid (4'-nitro)-anilide, 2-hydroxy-3-naphthoic acid (4'-propionylamino)-anilide, 2-hydroxy-3-naphthoic acid (4'-butyrylamino)-anilide, 2-hydroxy-3-naphthoic acid (4'-chloroacetylamino)-anilide, 2-hydroxy-3-naphthoic acid (4'-carbomethoxyamino)-anilide-hydroxy-3-naphthoic acid (2'-chloro-4'-acetylamino)-anilide, 2-hydroxy-3-naphthoic acid (2',5'-dimethyl-4'-acetylamino)-anilide, 2-hydroxy-3-naphthoic acid (2',5'-dimethyl-4'-benzenesulphonylamino)-anilide, 2-hydroxy-3-naphthoic acid (2',5'-dimethoxy-4'-acetylamino)-anilide, 2-hydroxy-3-naphthoic acid (2'-chloro-5'-methyl-4'-acetylamino)-anilide, 2-hydroxy-3-naphthoic acid (2',5'-dichloro-4'-benzoylamino)-anilide, 2-hydroxy-3-naphthoic acid [2',5'-dichloro-4'-(4''-chlorobenzoylamino)]-anilide, 2-hydroxy-3-naphthoic acid [2',5'-dichloro-4'-(4''-methylbenzoylamino)]-anilide, 2-hydroxy-3-naphthoic acid (2',5'-dimethyl-4'-benzoylamino)-anilide, 2-hydroxy-3-naphthoic acid [2',5'-dimethyl-4'-(4''-chlorobenzoylamino)]-anilide, 2-hydroxy-3-naphthoic acid [2'-methoxy-5'-chloro-5'-(4''-methylbenzoylamino)]-anilide, 2-hydroxy-3-naphthoic acid (2',5'-dichloro-4'-phenylureido)-anilide, 3-(2',3'-hydroxynaphthoylamino)-4-chlorobenzoic acid 2'',5''-dichloroanilide, 6-(2',3'-hydroxynaphthoylamino)-2,4-dioxotetrahydroquinazoline, 5-(2',3'-hydroxynaphthoylamino)-benzimidazolone-(2), 2-hydroxy-3-naphthoic acid(2'-phenoxy-5'-chloro)-anilide, N-[4-(2',3'-hydroxynaphthoylamino)-phenyl ]-phthalimide and 2-hydroxy-3-naphthoic acid (4'-phenyloxamido-anilide.

β. Amongst the series of the acetoacetic acid arylamides: acetoacetic acid anilide, acetoacetic acid 2-chloro-anilide, acetoacetic acid 2,4-dimethyl-anilide, acetoacetic acid 2-methyl-anilide, acetoacetic acid 2,5-dimethoxy-4-chloroanilide, acetoacetic acid 2-methoxy-anilide, acetoacetic acid napthtyl-(1)-amide, acetoacetic acid 2-methyl-3-chloroanilide, acetoacetic acid 2-methyl-4-chloro-anilide, acetoacetic acid 2,4-dichloro-anilide, acetoacetic acid 2-nitro-4-chloro-anilide, acetoacetic acid 2-nitro-4-methyl-anilide, acetoacetic acid 2-nitro-4-methoxy-anilide, acetoacetic acid 4-ethoxy-anilide, acetoacetic acid 4-acetylamino-anilide, acetonacetic acid 4-benzoylamino-anilide, acetoacetic acid 2-methoxy-4-methyl-anilide, acetoacetic acid 4-methyl-anilide, acetoacetic acid 2-chloro-4-nitro-anilide, acetoacetic acid 2,4-dinitro-anilide, acetoacetic acid 2,5-dichloro-anilide, acetoactic acid 2-methyl-5-nitroanilide, acetoacetic acid 2,4-dimethoxy-5-chloroanilide, 2-acetoacetylamino-6-methoxybenzthiazole, acetoacetic acid 2-methoxy-4-chloro-5methylanilide, acetoacetic acid 2-phenoxy-5-chloro-anilide, acetoacetic acid 2,5-dichloro-4-acetylamino-anilide, acetoacetic acid 2-chloro-4-acetylamino-anilide, acetoacetic acid 2,5-dichloro-4-benzoylamino-anilide and acetoacetic acid 2,5-dimethoxy-4-(4′-chlorobenzoylamino)-anilide.

γ. From amongst the series 1-phenyl-5-pyrazolones: 1-(3′-sulphamoyl-phenyl)-3-methyl-5-pyrazolone, 1-(4′-sulphamoylphenyl)-3-methyl-5-pyrazolone, 1-(3′-benzoylamino-phenyl)-3-methyl-5-pyrazolone, 1-(4′-benzoylamino-phenyl)-3-methyl-5-pyrazolone, 1-[3′-(4″-chloro-benzoly-amino)-phenyl]-3-methyl-5-pyrazolone, 1-phenyl-5-pyrazolone-3-carboxylic acid amide, 1-phenyl-5-pyrazolone-3-carboxylic acid N-ethyl-amide, 1-phenyl-5-pyrazolone-3-carboxylic acid anilide, 1-phenyl-5-pyrazolone-3-carboxylic acid (4′-methyl)-anilide, 1-(3′-carbamyl-phenyl)-3-methyl-5-pyrazolone, 1-(4′-carbamylphenyl)-3-methyl-5-pyrazolone, 1-(3′-phenylcarbamyl)-3-methyl-5-pyrazolone, 1-(4′-phenylcarbamyl-phenyl)-3-methyl-5-pyrazolone, 1-(4′-chlorophenyl)-5-pyrazolone-3-carboxylic acid amide, 1-(4′-fluorophenyl)-5-pyrazolone-3-carboxylic acid anilide, 1-(2′-methylphenyl)-5-pyrazolone-3-carboxylic acid amide, 1-(3′-nitrophenyl)-5-pyrazolone-3-carboxylic acid anilide, 1-(2′,-5′-dichlorophenyl)-5-pyrazolone-3-carboxylic acid anilide, 1-(4′-chlorophenyl)-3-methyl-5-pyrazolone, 1-(2′-methoxyphenyl)-3-methyl-5-pyrazolone, 1-(4′-methylphenyl)-3-methyl-5-pyrazolone, 1-(3′-cyanophenyl)-3-methyl-5-pyrazolone, 1-(3′-nitrophenyl)-3-methyl-5-pyrazolone, 1-phenyl-3-methyl-5-pyrazolone, 1-(2′-chlorophenyl)-3-methyl-5-pyrazolone, 1-(3′-chlorophenyl)-3-methyl-5-pyrazolone, 1-(2′,5′-dichlorophenyl)-3-methyl-5-pyrazolone, 1-(4′-nitrophenyl)-3-methyl-5-pyrazolone, 1-phenyl-5-pyrazolone-3-carboxylic acid ethyl ester, 1-(3′nitrophenyl)-5-pyrazolone-3-carboxylic acid ethyl ester, 3-methyl-5-pyrazolone, 1-(2′,5′-dichlorophenyl)-3-cyano-5-pyrazolone, 1-(3′-acetylaminophenyl)-3-methyl-5-pyrazolone, 1-(4′-acetylaminophenyl)-3-methyl-5-pyrazolone, 1-(4′-ethoxycarbonyl)-5-pyrazolone-3-carboxylic acid amide, 1,3-dimethyl-5-pyrazolone, 1-butyl-3-methyl-5-pyrazolone, 1-β-cyanoethyl-5-pyrazolone-3-carboxylic acid amide, 1-β-hydroxyethyl-3-methyl-5-pyrazolone, 1-β-ethoxycarbonyl-ethyl-5-pyrazolone-3-carboxylic acid amide, 1-β-chloro-ethyl-5-pyrazolone-3-carboxylic acid anilide, 1-β-benzoylaminoethyl-3-methyl-5-pyrazolone, 1-γ-acetylaminopropyl-3-methyl-5-pyrazolone and 1-β-cyanoethyl-3-methyl-5-pyrazolone.

δ. Further heterocyclic coupling components: 6-methyl-2,4-dihydroxypyridine, 1,6-dimethyl-hydroxy-2,4-pyridone, 1-ethyl-2-methyl-2,4-hydroxypyridone, 4-methyl-5-cyano-2,6-dihydroxypyridine, 4-methyl-2,6-dihydroxypyridine-3-carboxylic acid amide, 4-methyl-2,6-dihydroxypyridine-5-carboxylic acid amide, 2,6-dihydroxy-4-aminopyridine-5-carboxylic acid amide, 1,4-dimethyl-3-cyano-2,6-hydroxypyridone, 1-propyl-4-methyl-3-cyano-hydroxy-2,6-pyridone, 1-(β-methoxy-ethyl)-4-methyl-3-cyano-2,6-hydroxypyridone, 2,4-dihydroxyquinoline, 1-methylhydroxy-2,4-quinolone, barbituric acid, 2,4-diiminobarbituric acid, 1-phenyl-3-methyl-5-aminopyrazole, 1-(3′-carbamylphenyl)-3-methyl-5-aminopyrazole, 1-(3′-phenylcarbamyl-phenyl)-3-methyl-5-aminopyrazole, 1-(4′-acetyl-aminophenyl)-3-methyl-5-aminopyrazole, 1-(4′-benzoylaminophenyl)-3-methyl-5-aminopyrazole and 1-(β-cyanoethyl)-3-methyl-5-aminopyrazole.

Dyestuff-carboxylic acid halides (VI) can be manufactured according to known processes by coupling diazotised aminocarboxylic acids $$H_2N-D-COOH \qquad X.$$

with coupling components (V) and converting the resulting dyestuff-carboxylic acids into the acid halide, preferably into the acid chloride, for example according to German Patent No. 921,223.

Examples of suitable aminocarboxylic acids (X) are: 3-aminobenzoic acid, 3-amino-4-chlorobenzoic acid, 3-amino-6-chlorobenzoic acid, 3-amino-4,6-dichlorobenzoic acid, 3-amino-4-methylbenzoic acid, 3-amino-4,6-dimethylbenzoic acid, 3-amino-5-nitrobenzoic acid, 3-amino-6-nitrobenzoic acid, 3-amino-4-methoxybenzoic acid, 3-amino-4-ethoxybenzoic acid, 3-amino-4-methoxy-6-chlorobenzoic acid, 3-amino-4-phenoxy benzoic acid, 3-amino-4-methoxycarbonylbenzoic acid, 3-amino-5-benzoylaminobenzoic acid, 4-aminobenzoic acid, 3-nitro-4-aminobenzoic acid, 2-nitro-4-aminobenzoic acid, 3-methyl-4-aminobenzoic acid and 2-aminonaphthalene-6-carboxylic acid.

The bis- or tris-diazotisation of the amines (IV) takes place in accordance with generally customary processes, for example in dilute hydrochloric acid with aqueous sodium nitrite solution, or in concentrated sulphuric acid or in anhydrous glacial acetic acid or propionic acid with the calculated amount, or an excess, of nitrosylsulphuric acid or sodium nitrite, at temperatures of about 0° to 5°C.

The coupling of 1 mol of bis- or tris-diazotised amine (IV) with 2 or 3 mols of a coupling component (V) is achieved, for example, by gradually combining the acid, aqueous diazonium salt solution with an aqueous, aqueous-organic or organic solution or suspension of the coupling component at temperatures between 0° and 30°C. At the same time a pH-value advantageous for the coupling reaction is established by adding alkalis, such as sodium carbonate, sodium bicarbonate or sodium hydroxide solution or buffer substances, such as alkali salts of phosphoric acid, formic acid or acetic acid, which can also already be contained in the solution of the coupling component. If desired, the solutions of diazonium salt and coupling component are combined in a mixing jet at a controlled pH-value. Coupling can take place in an acid, neutral or weakly alkaline medium. When coupling to 2,3-hydroxynaphthoic acid arylides, acetoacetic acid arylides and pyrazolones, a pH-value of between 4 and 6 has proved appropriate.

In the manufacture of pigment dyestuffs it is often advantageous if the coupling is carried out in the presence of an anionic, cationic or non-ionic surface-active agent, for example an alkylsulphonate and/or a polycondensation product of octyl alcohol and ethylene oxide and/or in the presence of an organic solvent. The surface-active agents can be mixed into the solution of the coupling component. Possible organic solvents which can also be used for dissolving the coupling component are compounds which are completely or partially miscible with water, such as, for example, glycol, glycol monomethyl ether, butyl glycol, pyridine, dimethylformamide or N-methylpyrrolidone, and also water-insoluble solvents, for example toluene, 1,2-dichlorobenzene or nitrobenzene.

For isolation, the dyestuffs are filtered off from the coupling mixture, which after completion of the reaction is heated if desired, and are washed with solvents, such as, for example, alcohol, acetone or dimethylformamide, and then with water. At times it proves advantageous to heat the pigments thus obtained in an organic solvent, such as n-butanol, pyridine, dimethylformamide, toluene, chlorobenzene, 1,2-dichlorobenzene or nitrobenzene in order to increase the colour strength, solvent fastness and light fastness through this after-treatment. The reaction of, for example, dyestuff-carboxylic acid halides (VI) manufactured according to German Patent No 921,223 with dihydroxy compounds (VII) to give the dyestuffs (I) according to the invention is carried out in inert organic solvents such as chlorobenzene, dichlorobenzene, trichlorobenzene, toluene, xylene or nitrobenzene, at temperature of betweeen 50° and 150°C, preferably in the presence of acid-binding agents such as, for example, pyridine or sodium acetate.

The new dyestuffs (I) are water-insoluble and are suitable for use as dispersion dyestuffs for dyeing synthetic fibre materials and above all for use as pigment dye-stuffs.

The pigment dyestuffs, because of their good fastness to light and very good fastness to solvent or fastness to migration, are suitable for the most diverse pigment applications, for example for the manufacture of compositions of very fast pigmentation, such as mixtures with other substances, paints, printing inks, pigmented paper and pigmented macromolecular substances.

By mixtures with other substances there may be understood, for example, mixtures with inorganic white pigments such as titanium dioxide. The term paint for example represents physically or oxidatively drying lacquers, stoving lacquers, reactive lacquers, two-component lacquers, dispersion paints for weathering-resistant coatings, and distempers. By printing inks there are to be understood those for paper, textile and tinplate printing. The macromolecular substances can be of natural origin, such as rubber, can be obtained by chemical modification, such as acetylcellulose, cellulose butyrate or viscose, or can be manufactured synthetically, such as polymers, polyaddition products and polycondensates. The following may be mentioned: plastic compositions such as polyvinyl chloride, polyvinyl acetate, polyvinyl propionate, polyesters, for example polyethylene terephthalate, polyamides, high molecular weight polyamides, polymers and copolymers of acrylic esters, methacrylic esters, acrylonitrile, acrylamide, butadiene and styrene, and polyurathanes and polycarbonates.

EXAMPLE 1

11.9 g of 1,4-bis-(2'-aminobenzoyloxy)-butane are dissolved in 15 ml of warm glacial acetic acid and introduced, with stirring, into a mixture of 200 ml of water, 100 g of ice and 15 ml of concentrated hydrochloric acid. After stirring for 20 minutes at 0°C, a solution of 5.5 g of sodium nitrite in 25 ml of water is rapidly poured in and the mixture is stirred for a further 3 hours at 0°C before excess nitrite is destroyed by adding aqueous amidosulphonic acid.

This solution of the tetrazonium salt and a solution of 23.5 g of 2-hydroxy-3-naphthoic acid (2'-methyl-4'-chloro)-anilide in 300 ml of glycol monomethyl ether and 5 ml of 45% strength sodium hydroxide solution are simultaneously introduced dropwise over the course of 1 hour, at temperatures of up to 5°C and with good stirring, into a receiver which contains 300 ml of glycol monomethyl ether and 300 g of ice. Whilst doing so, the pH-value of the coupling mixture is kept at between 4 and 6 by introducing solid hydrated sodium acetate and the temperature is kept at 0°C by throwing in further ice. Thereafter the mixture is stirred for a further 5 hours at room temperature and is then warmed to 80°C for 1 hour and filtered. The filter cake is washed with 500 ml of water and 500 ml of methanol and is dried in vacuo at 50°C. The resulting pigment, of the formula

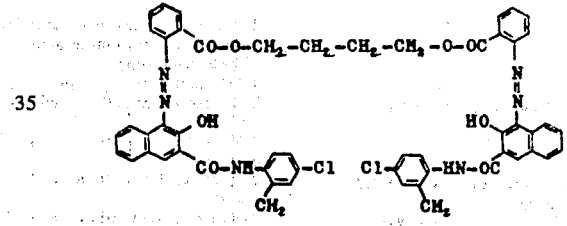

is optionally stirred in 350 ml of 1,2-dichlorobenzene for 5 hours at 130°C in order to improve the solvent fastness, filtered off, washed with 1,2-dichlorobenzene, methanol and water, and dried as above.

8 g of the dyestuff which have been brought to a finely divided form by grinding with 2ml of xylene and 160 g of sodium chloride in a vibration mill and washing out the sodium chloride constituents, are dispersed, in a ball mill, in a stoving lacquer of 25 g of coconut oil alkyd resin (40% coconut oil), 10 g of melamine resin, 5 ml of toluene and 7 ml of glycol monomethyl ether. The mixture is applied to the substrate to be lacquered, the lacquer is cured for half an hour by stoving at 130°C, and brilliant, yellowish-tinged red lacquerings having very good fastness to overlacquering and good fastness to light are obtained.

The tetrazo and coupling components listed in the table which follows also yield valuable pigments, having the indicated colour shades, if a procedure analogous to Example 1 is followed.

| Tetrazo Component | Coupling Component | Colour Shade |
|---|---|---|
| 1,4-Bis-(2'-aminobenzoyloxy)-butane | 2-Hydroxy-3-naphthoic acid anilide | red |
| " | 2-Hydroxy-3-naphthoic acid (2',5'-dimethoxy-4'-chloro)-anilide | red-brown |
| " | 2-Hydroxy-3-naphthoic acid (2',5'-dimethoxy-4'-benzoylamino)-anilide | brown |

-continued

| Tetrazo Component | Coupling Component | Colour Shade |
|---|---|---|
| 1,4-Bis-(2'-aminobenzoyloxy)-butane | 2-Hydroxy-3-naphthoic acid (4'-acetylamino)-anilide | yellowish-tinged red |
| " | 2-Hydroxy-3-naphthoic acid (2'-methyl)-anilide | yellowish-tinged red |
| " | 2-Hydroxy-3-naphthoic acid (2'-methyl-4'-methoxy)-anilide | red |
| " | 2-Hydroxy-3-naphthoic acid (2'-methyl-4'-bromo)-anilide | yellowish-tinged red |
| " | 1-Acetoacetylamino-4-acetylamino-benzene | greenish-tinged yellow |
| " | 1-Acetoacetylamino-2-methyl-4-chloro-benzene | strongly greenish-tinged yellow |
| " | 1-Acetoacetylamino-2,5-dimethoxy-4-chloro-benzene | greenish-tinged yellow |
| " | 1-Acetoacetylamino-4-benzoylamino-benzene | yellow |
| " | 1-Acetoacetylamino-2-nitro-4-methoxy-benzene | greenish-tinged yellow |
| " | 1-Phenyl-5-pyrazolone-3-carboxylic acid amide | yellow |
| " | 2-Hydroxy-3-naphthoic acid (4'-ethoxy)-anilide | yellowish-tinged red |
| " | 2-Hydroxy-3-naphthoic acid (2'-methoxy)-anilide | red |
| " | 2-Hydroxy-3-naphthoic acid (2',5'-dichloro-4'-benzoylamino)-anilide | red |
| 1,2-Bis-(2'-aminobenzoyloxy)-ethane | 2-Hydroxy-3-naphthoic acid (4'-propionylamino)-anilide | red |
| " | 1-Acetoacetylamino-4-benzoylamino-benzene | yellow |
| " | 4-Methyl-2,6-dihydroxypyridine-5-carboxylic acid amide | yellow |
| 1,4-Bis-(2'-aminobenzoyloxy)-butine-(2) | 2-Hydroxy-3-naphthoic acid (2'-methyl)-anilide | red |
| " | 2-Hydroxy-3-naphthoic acid (4'-acetylamino)-anilide | bluish-tinged red |
| " | 2-Hydroxy-3-naphthoic acid (2'-methyl-4'-chloro)-anilide | yellowish-tinged red |
| " | 2-Hydroxy-3-naphthoic acid (4'-ethoxy)-anilide | red |
| " | 1-Acetoacetylamino-2,5-dimethoxy-4-benzoylamino-benzene | reddish-tinged yellow |
| " | 2-Hydroxy-3-naphthoic acid anilide | red |
| " | 2-Hydroxy-3-naphthoic acid (2',5'-dimethoxy-4'-chloro)-anilide | red |
| " | 1-(3'-Acetylaminophenyl)-3-methyl-5-pyrazolone | Yellow |
| 1,6-Bis-(2'-aminobenzoyloxy)-hexane | 2-Hydroxy-3-naphthoic acid (4'-acetylamino)-anilide | Red |
| " | 2-Hydroxy-3-naphthoic acid (2',5'-dichloro)-anilide | Red |
| 1,3-Bis-(2'-aminobenzoyloxy)-2,2-dimethyl-propane | 2-Hydroxy-3-naphthoic acid (4'-acetylamino)-anilide | Red |
| 2,2'-Bis(2'-aminobenzoyloxy)-diethyl-ether | 2-Hydroxy-3-naphthoic acid (2',5'-dimethoxy-4'-chloro)-anilide | Yellowish-tinged red |
| " | 2-Hydroxy-3-naphthoic acid (4'-acetylamino)-anilide | Bluish-tinged red |
| " | 2-Hydroxy-3-naphthoic acid (2'-methyl-4'-chloro)-anilide | Red |
| " | 2-Hydroxy-3-naphthoic acid (2',5'-dimethoxy-4'-benzoylamino)-anilide | Red-brown |
| " | 2-Hydroxy-3-naphthoic acid anilide | Red |
| " | 1-(4'-Phenylcarbamyl)-3-methyl-5-pyrazolone | Yellow |
| 2,2'-Bis-(2'-aminobenzoyloxy)-diethyl sulphide | 2-Hydroxy-3-naphthoic acid (4-acetylamino)-anilide | Red |
| " | 2-Hydroxy-3-naphthoic acid (2'-methyl-4'-chloro)-anilide | Yellowish-tinged red |
| " | 2-Hydroxy-3-naphthoic acid (2',5'-dimethoxy-4'-chloro)-anilide | Red-brown |
| " | 2-Hydroxy-3-naphthoic acid (2'-chloro-4'-acetylamino)-anilide | Red |
| 1,4-Bis-(2'-aminobenzoyloxy)-benzene | 2-Hydroxy-3-naphthoic acid (2'-methyl-4'-chloro)-anilide | Red |
| " | 2-Hydroxy-3-naphthoic acid (4'-ethoxy)-anilide | Yellowish-tinged red |
| " | 2-Hydroxy-3-naphthoic acid anilide | Red |
| " | 2-Hydroxy-3-naphthoic acid (2'-methyl)-anilide | Yellowish-tinged red |
| " | 2-Hydroxy-3-naphthoic acid (4'-acetylamino)-anilide | Red |
| " | 2-Hydroxy-3-naphthoic acid (2',5'-dimethoxy-4'-chloro)-anilide | Red-brown |
| " | 1-Acetoacetylamino-4-acetylamino-benzene | Greenish-tinged yellow |
| 1,4-Bis-(2'-amino-5-chlorobenzoyloxy)-butane | 2-Hydroxy-3-naphthoic acid (2',4'-dichloro)-anilide | Red |
| " | 2-Hydroxy-3-naphthoic acid (4'-acetylamino)-anilide | Red |
| " | 2-Hydroxy-3-naphthoic acid anilide | Red |
| " | 1-Phenyl-5-pyrazolone-3-carboxylic acid amide | Red |

-continued

| Tetrazo Component | Coupling Component | Colour Shade |
|---|---|---|
| 1,4-Bis-(3'-amino-4'-chlorobenzoyloxy)-butane | 2-Hydroxy-3-naphthoic acid anilide | Bluish-tinged red |
| " | 2-Hydroxy-3-naphthoic acid (2',5'-dimethoxy-4'-chloro)-anilide | Red-brown |
| " | 2-Hydroxy-3-naphthoic acid (2'-methyl-4'-chloro)-anilide | Yellowish-tinged red |
| " | 1-Acetoacetylamino-4-acetylamino-benzene | Yellow |
| " | 2-Hydroxy-3-naphthoic acid (4'-ethoxy)-anilide | Red |
| " | 2-Hydroxy-3-naphthoic acid (2'-methyl)-anilide | Red |
| 1,4-Bis-(3'-amino-4'-methoxy-benzoyloxy)-butane | 2-Hydroxy-3-naphthoic acid (4'-p-chlorobenzoyl-amino)-anilide | Red |
| " | 2-Hydroxy-3-naphthoic acid (2'-methyl-4'-chloro)-anilide | Red |
| 1,3-Bis-(3'-amino-4'-phenoxy-benzoyloxypropane | 2-Hydroxy-3-naphthoic acid (2'-chloro-4'-acetyl-amino)-anilide | Red |
| 1,4-Bis-(4'-aminobenzoyloxy)-butane | 2-Hydroxy-3-naphthoic acid (2'-methyl-4'-chloro)-anilide | Red |
| " | 2-Hydroxy-3-naphthoic acid (4'-ethoxy)-anilide | Bluish-tinged red |
| " | 2-Hydroxy-3-naphthoic acid (4'-acetylamino)-anilide | Red |
| " | 1-Acetoacetylamino-4-acetylamino-benzene | Greenish-tinged yellow |
| " | 1-(2',5'-dichlorophenyl)-5-pyrazolone-3-carboxylic acid amide | Yellow |
| 1,2-Bis-(2'-amino-4'-chlorobenzoyl)-ethane | 2-Hydroxy-3-naphthoic acid anilide | Red |
| " | 2-Hydroxy-3-naphthoic acid (2'-methyl-4'-chloro)-anilide | Red |
| 1,6-Bis-(2'-amino-3',5'-dichloro-benzoyloxy)-hexane | 2-Hydroxy-3-naphthoic acid anilide | Red |
| 1,4-Bis-(2'-amino-5'-acetylamino-benzoyloxy)-butane | 2-Hydroxy-3-naphthoic acid anilide | Bluish-tinged red |
| " | 2-Hydroxy-3-naphthoic acid (2'-chloro)-anilide | Bluish-tinged red |
| 1,4-Bis-(3'-methyl-4'-amino-benzoyloxy)-butane | 2-Hydroxy-3-naphthoic acid (4'-chloro)-anilide | Red |
| " | 2-Hydroxy-3-naphthoic acid (4'-ethoxy)-anilide | Bluish-tinged red |
| 1,2-Bis-(2'-amino-5'-acetylamino-benzoyloxy)-ethane | 2-Hydroxy-3-naphthoic acid (2',5'-dimethoxy-4'-chloro)-anilide | Red |
| Methyl-2,2'-bis-(2''-aminobenzoyloxy)-diethylamine | 2-Hydroxy-3-naphthoic acid anilide | Red |
| " | 2-Hydroxy-3-naphthoic acid (2'-methyl-4'-chloro)-anilide | Red |
| " | 2-Hydroxy-3-naphthoic acid (4'-ethoxy)-anilide | Red |
| " | 2-Hydroxy-3-naphthoic acid (4'-acetylamino)-anilide | Bluish-tinged red |
| " | 1-Acetoacetylamino-2,5-dichloro-benzene | Yellow |
| " | 2-Hydroxy-3-naphthoic acid (4'-benzoylamino)-anilide | Bluish-tinged red |

EXAMPLE 2

14.5 g of 1,2-bis-(2'-amino-5'-nitrobenzoyloxy)e-thane are introduced at 0°C, over the course of 2 hours, into a mixture of 45 ml of concentrated sulphuric acid and 13 ml of 40% strength nitrosylsulphuric acid. The mixture is stirred for a further 4 hours at 0°C, poured out onto 300 g of ice and clarified, and excess nitrite is destroyed with aqueous amidosulphonic acid. If necessary, the temperature of the solution is kept at 0°C by throwing in ice.

The tetrazonium salt solution thus manufactured is introduced dropwise over the course of 1 hour at 0°C, simultaneously with a solution of 24 g of 2-hydroxy-3-naphthoic acid (4'-acetylamino)-anilide in 300 ml of glycol monomethyl ether and 5 ml of 45% strength sodium hydroxide solution, into a receiver which contains 300 ml of glycol monomethyl ether and 300 g of ice. Whilst doing so, the pH-value of the coupling mixture is kept at between 4 and 6 by introducing solid hydrated sodium acetate and the temperature is kept at 0°C by throwing in further ice. Thereafter the mixture is stirred for a further 5 hours at room temperature and is then warmed for 1 hour at 80°C and filtered. The filter cake is washed with 500 ml of methanol and 500 ml of water and is dried in vacuo at 50°C. The resulting pigment of the formula

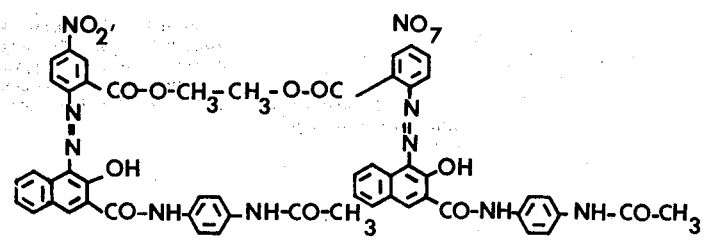

is optionally stirred with 350 ml of 1,2-dichlorobenzene for 5 hours at 130°C in order to improve the solvent fastness, filtered off, washed with 1,2-dichlorobenzene, methanol and water and dried as above.

A mixture of 65 g of polyvinyl chloride, 35 g of diisooctyl phthalate, 2 g of dibutyl-tin mercaptide, 0.5 g of titanium dioxide and 0.5 g of the above pigment, which has been brought to a finely divided state by grinding with sodium chloride, is pigmented on a mixing mill at 165°C. A bluish-tinged red mass is obtained, which can be used for the manufacture of films or mouldings. The brilliant dyeing is distinguished by good fastness to light and very good fastness to migration.

The tetrazo components and coupling components listed in the table which follows also yield valuable pigments having the indicated colour shades if a procedure analogous to EXAMPLE 2 is followed.

| Tetrazo Component | Coupling Component | Colour Shade |
|---|---|---|
| 1,2-Bis-(2'-amino-5'-nitrobenzoyl)-ethane | 2-Hydroxy-3-naphthoic acid (2'-methyl)-anilide | Carmine |
| " | 2-Hydroxy-3-naphthoic acid (2'-methyl-4'-chloro)-anilide | Bluish-tinged red |
| " | 1-Acetoacetylamino-2-methyl-4-chloro-benzene | Greenish-tinged yellow |
| " | 1-Acetoacetylamino-4-acetylamino-benzene | Reddish-tinged yellow |
| " | 1-Acetoacetylamino-2,5-dimethoxy-4-chloro-benzene | Reddish-tinged yellow |
| " | 1-Acetoacetylamino-2-chloro-benzene | Greenish-tinged yellow |
| " | 1-Phenyl-3-methyl-5-aminopyrazole | Red |
| " | 1-Phenyl-3-methyl-5-pyrazolone | Reddish-tinged yellow |
| " | 2-Hydroxy-3-naphthoic acid (2'-methyl-4'-chloro-5'-methyl)-anilide | Claret |
| " | 2-Hydroxy-3-naphthoic acid (4'-ethoxy)-anilide | Bluish-tinged red |
| " | 2-Hydroxy-3-naphthoic acid (naphthyl-(1)-amide | Bluish-tinged red |
| " | 5-(2',3'-Hydroxynaphthoylamino)-benzimidazolone-(2) | Bluish-tinged red |
| " | 2-Hydroxy-3-naphthoic acid (2'-phenoxy-5'-chloro)-anilide | Bluish-tinged red |
| " | 3-(2',3'-Hydroxynaphthoylamino)-4-chloro-benzoic acid 2'',5''-dichloroanilide | Red |
| " | 2-Hydroxy-3-naphthoic acid (2',5'-dichloro-4'-acetylamino)-anilide | Bluish-tinged red |
| " | 2-Hydroxy-3-naphthoic acid (4'-butyrylamino)-anilide | Bluish-tinged red |
| " | 2-Hydroxy-6-bromo-3-naphthoic acid (4'-ethoxy)-anilide | Bluish-tinged red |
| " | 2-Hydroxy-6-methoxy-3-naphthoic acid (2'-methyl-4'-chloro)-anilide | Bluish-tinged red |
| " | 1-Acetoacetylamino-2-phenoxy-5-chloro-benzene | Yellow |
| " | 1-Acetoacetylamino-2-methyl-benzene | Yellow |
| " | 1-Acetoacetylamino-naphthalene | Yellow |
| " | 1-Acetoacetylamino-2,4-dimethoxy-5-chloro-benzene | Reddish-tinged yellow |
| " | 1-Acetoacetylamino-2,5-dichloro-4-acetylamino-benzene | Reddish-tinged yellow |
| " | 1-Acetoacetylamino-2,5-dichloro-4-benzoylamino-benzene | Reddish-tinged yellow |
| " | 1-(β-cyanoethyl-5-pyrazolone-3-carboxylic acid amide | Reddish-tinged yellow |
| " | 1-(3'-Sulphamoylphenyl)-3-methyl-5-pyrazolone | Reddish-tinged yellow |
| " | 1-(4'-Benzoylaminophenyl)-3-methyl-5-pyrazolone | Reddish-tinged yellow |
| " | 1-(4'-Fluorophenyl)-5-pyrazolone-3-carboxylic acid anilide | Reddish-tinged yellow |
| " | 3-Methyl-5-pyrazolone | Reddish-tinged yellow |
| " | 1-Phenyl-3-cyano-5-pyrazolone | Reddish-tinged yellow |
| " | 1-(2',5'-Dichlorophenyl)-5-pyrazolone-3-carboxylic acid amide | Reddish-tinged yellow |
| " | 1-(4'-Nitrophenyl)-3-methyl-5-pyrazolone | Reddish-tinged yellow |
| " | 6-Methyl-2,4-dihydroxypyridine | Yellow |
| " | 4-Methyl-5-cyano-2,6-dihydroxypyridine | Yellow |
| " | 4-Methyl-2,6-dihydroxypyridine-3-carboxylic acid amide | Yellow |
| " | 1-Methyl-hydroxy-2,4-quinolone | Yellow |
| 2,2'-Bis-(2''-amino-5''-nitrobenzoyl)-diethyl ether | 2-Hydroxy-3-naphthoic acid (4'-acetylamino)-anilide | Red |

-continued

| Tetrazo Component | Coupling Component | Colour Shade |
|---|---|---|
| " | 2-Hydroxy-3-naphthoic acid (2'-methyl-4'-chloro)-anilide | Red |
| " | 2-Hydroxy-3-naphthoic acid (2',5'-dimethoxy-4'-chloro)-anilide | Red |
| " | 2-Hydroxy-3-naphthoic acid (4'-ethoxy)-anilide | Bluish-tinged red |
| " | 1-Phenyl-3-methyl-5-pyrazolone | Reddish-tinged yellow |
| " | 1-Acetoacetylamino-2-methyl-4-chloro-benzene | Greenish-tinged yellow |
| " | Barbituric acid | Greenish-tinged yellow |
| " | 1-Acetoacetylamino-2,5-dimethoxy-4-chloro-benzene | Reddish-tinged yellow |
| " | 1-Acetoacetylamino-4-acetylamino-benzene | Yellow |
| " | 1-(β-Methoxyethyl)-4-methyl-3-cyanohydroxy-2,6-pyridone | Yellow |
| 1,4-Bis-(2'-amino-5'-nitrobenzoyloxy)-butane | 2-Hydroxy-3-naphthalic acid anilide | Bluish-tinged red |
| " | 2-Hydroxy-3-naphthoic acid (2-methyl-4'-chloroanilide | Bluish-tinged red |
| " | 2-Hydroxy-3-naphthoic acid (4'-acetylamino)-anilide | Bluish-tinged red |
| " | 2-Hydroxy-3-naphthoic acid (2'-methyl)-anilide | Bluish-tinged red |
| " | 3-Methyl-5-pyrazolone | Yellow |
| " | 1-(β-Cyanoethyl)-3-methyl-5-pyrazolone | Yellow |
| " | 1-Phenyl-3-methyl-5-pyrazolone | Reddish-tinged yellow |
| " | 1-Phenyl-5-pyrazolone-3-carboxylic acid amide | Reddish-tinged yellow |
| 1,8-Bis-(2'-amino-5-nitrobenzoyloxy)-octane | 2-Hydroxy-3-naphthoic acid anilide | Red |
| 2,5-Bis-(2-amino-5-nitrobenzoyloxy)-2,5-dimethylhexane | 2-Hydroxy-3-naphthoic acid (2',4'-dichloro)-anilide | Red |
| " | 1-Acetoacetylamino-4-acetylamino-benzene | Yellow |

EXAMPLE 3

35.5 g of the dyestuff-carboxylic acid which is obtained by coupling diazotised 3-amino-4-chloro-benzoic acid with 2-hydroxy-3-naphthoic acid (4'-ethoxy)-anilide, are suspended in 500 ml of 1,2-dichlorobenzene. If necessary, the last traces of moisture are removed by azeotropic distillation in vacuo. 14 g of thionyl chloride are introduced dropwise over the course of 1 hour at 130°C whilst stirring and the mixture is stirred for a further 1 to 2 hours at this temperature until the evolution of gas (SO$_2$/HCl) has ceased. The mixture is then allowed to cool to 50°C, excess thionyl chloride is removed by applying a waterpump vacuum and thereafter 3.25 g of 1,4-butanediol and 8 g of dry pyridine are successively added to the solution of the dyestuff-carboxylic acid chloride. The mixture is stirred for 1 hour at 50°C, then warmed to 130°C over the course of 1 hour and stirred for a further 5 hours at this temperature. The pigment which has precipitated is filtered off at 100°C, successively washed with 200 ml of 1,2-dichlorobenzene at 100°C, 100 ml of cold 1,2-dichlorobenzene, 250 ml of methanol and 250 ml of water and dried in vacuo at 50°C. The pigment corresponds to the formula A printing ink manufactured by grinding 35 g of the above dyestuff, which has been brought to a finely divided state, and 65 g of linseed oil and adding 1 g of drier (Co naphthenate, 50% strength in white spirit) yields red offset prints of high brilliance and colour strength, good fastness to light and very good fastness to lacquering. The use of this printing ink in letterpress printing, collotype printing, lithographic printing or die stamping gives red prints of similar fastness properties.

Analogously to Example 3, the diazo components and coupling components listed in the table which follows, after conversion into the dyestuff-carboxylic acid chloride and reaction with the dihydroxy compound also mentioned, also give valuable pigments having the indicated colour shades. In some cases it proved advisable to isolate the dyestuff-carboxylic acid chloride before the reaction with the dihydroxy compound.

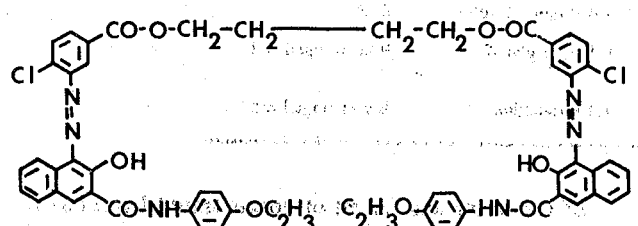

-continued

| Diazo Component | Coupling Component | Dihydroxy Compound | Colour Shade |
|---|---|---|---|
| 4-Chloro-3-amino-benzoic acid | 2-Hydroxy-3-naphthoic acid (4'-acetylamino)-anilide | 1,4-Butanediol | Bluish-tinged red |
| " | 2-Hydroxy-3-naphthoic acid (2'-methoxy)-anilide | " | Red |
| " | 2-Hydroxy-3-naphthoic acid (4'-chloro)-anilide | " | Red |
| " | 2-Hydroxy-3-naphthoic acid (2'-chloro)-anilide | " | Red |
| " | 2-Hydroxy-3-naphthoic acid 3'-trifluoromethyl)-anilide | " | Red |
| " | 2-Hydroxy-3-naphthoic acid (2'-4'-dimethyl)-anilide | " | Yellowish-tinged red |
| " | 2-Hydroxy-3-naphthoic acid (2'-methoxy-5'-methyl)-anilide | " | Red |
| " | 2-Hydroxy-3-naphthoic acid (2',5'-dichloro)-anilide | " | Red |
| " | 2-Hydroxy-3-naphthoic acid (naphthyl-(1'))-anilide | " | Red |
| " | 2-Hydroxy-3-naphthoic acid (2',5'-dichloro-4'-acetylamino)-anilide | " | Bluish-tinged red |
| " | 2-Hydroxy-3-naphthoic acid anilide | 1,6-Hexanediol | Red |
| " | 2-Hydroxy-3-naphthoic acid (4'-acetylamino)-anilide | " | Bluish-tinged red |
| " | 2-Hydroxy-3-naphthoic acid (2',5'-dimethoxy-4'-chloro)-anilide | " | Red-brown |
| 6-Chloro-3-amino-benzoic acid | 2-Hydroxy-3-naphthoic acid (4'-ethoxy)-anilide | Ethylene glycol | Red |
| 2,4-Dichloro-5-aminobenzoic acid | 2-Hydroxy-3-naphthoic acid (4'-acetylamino)-anilide | 1,4-Butanediol | Bluish-tinged red |
| " | 2-Hydroxy-3-naphthoic acid (4'-ethoxy)-anilide | Ethylene glycol | Red |
| 3-Amino-4-methyl-benzoic acid | 2-Hydroxy-3-naphthoic acid (4'-chloro)-anilide | " | Red |
| 3-Amino-4-methoxy-benzoic acid | 2-Hydroxy-3-naphthoic acid anilide | 1,4-Butanediol | Red |
| " | 2-Hydroxy-3-naphthoic acid (4'-ethoxy)-anilide | " | Bluish-tinged red |
| " | 2-Hydroxy-3-naphthoic acid (2',5'-dichloro-4'-acetylamino)-anilide | " | Bluish-tinged red |
| " | 2-Hydroxy-3-naphthoic acid (2'-methyl-4'-chloro)-anilide | 1,3-Propenediol | Red |
| 3-Amino-4-phenoxy-benzoic acid | 2-Hydroxy-3-naphthoic acid (2'-methyl)-anilide | Ethylene glycol | Red |
| 3-Amino-5-nitro-benzoic acid | 2-Hydroxy-3-naphthoic acid anilide | 1,4-Butanediol | Bluish-tinged red |
| " | 2-Hydroxy-3-naphthoic acid (4'-acetyl-amino)-anilide | 2,2-Dimethylpropene diol (1,3) | Bluish-tinged red |
| 3-Amino-4-ethoxy-benzoic acid | 2-Hydroxy-3-naphthoic acid (2'-chloro)-anilide | Ethylene glycol | Red |
| 2-Nitro-5-amino-benzoic acid | 2-Hydroxy-3-naphthoic acid (2'-methoxy)-anilide | 2,2'-dihydroxy-diethyl-ether | Bluish-tinged red |
| " | 2-Hydroxy-3-naphthoic acid (4'-acetyl-amino)-anilide | " | Bluish-tinged red |
| 4-Aminobenzoic acid | 2-Hydroxy-3-naphthoic acid (2'-chloro)-anilide | 1,4-Butanediol | Red |
| " | 2-Hydroxy-3-naphthoic acid (4'-benzoylamino)-anilide | " | Bluish-tinged red |
| 3-Methyl-4-amino-benzoic acid | 2-Hydroxy-3-naphthoic acid (4'-acetylamino)-anilide | " | Bluish-tinged red |
| " | 2-Hydroxy-3-naphthoic acid (2',4'-dichloro)-anilide | " | Red |
| " | 2-Hydroxy-3-naphthoic acid (4'-benzoylamino)-anilide | 1,3-Propenediol | Red |
| 3-Nitro-4-amino-benzoic acid | 2-Hydroxy-3-naphthoic acid anilide | 1,4-Butene-(2)-diol | Bluish-tinged red |
| " | 2-Hydroxy-3-naphthoic acid (2'-methyl-4'-chloro)-anilide | 1,4-Butanediol | Bluish-tinged red |
| " | 2-Hydroxy-3-naphthoic acid (4'-acetylamino)-anilide | 1,6-Hexenediol | Bluish-tinged red |
| 2-Nitro-4-amino-benzoic acid | 2-Hydroxy-3-naphthoic acid (4'-chloro)-anilide | 1,4-Butanediol | Bluish-tinged red |
| " | 2-Hydroxy-3-naphthoic acid (2'-methyl)-anilide | 1,4-Butanediol | Bluish-tinged red |
| " | 2-Hydroxy-3-naphthoic acid (2',4'-dimethoxy-5'-chloro)-anilide | 1,6-Hexanediol | Red |
| " | 2-Hydroxy-3-naphthoic acid (naphthyl-(1'))-amide | 1,4-Butine-(2)-diol | Red |
| 2-Chloro-4-methoxy-5-amino-benzoic acid | 2-Hydroxy-3-naphthoic acid anilide | Ethylene glycol | Bluish-tinged red |
| " | 2-Hydroxy-3-naphthoic acid (4'-acetylamino)-anilide | 1,4-Butanediol | Bluish-tinged red |

EXAMPLE 4

14.1 g of 1,1,1-tris-(2'-aminobenzoyloxymethyl)propane are dissolved in 20 ml of warm glacial acetic acid and the solution is introduced into a mixture of 200 ml of ice water and 20 ml of concentrated hydrochloric acid, whilst stirring. The diazo component dissolves as the hydrochloride. After 15 minutes' stirring a solution of 6.3 g of sodium nitrite in 30 ml of water is rapidly poured in at 0°C and the mixture is stirred for a further 3 hours at 0°C before excess nitrite is destroyed by adding aqueous amidosulphonic acid.

This solution of the tris-diazonium salt and a solution of 32.5 g of 2-hydroxy-3-naphthoic acid (2',5'-dimethoxy-4'-chloro)-anilide in 450 ml of glycol monomethyl ether and 6 ml of 45% strength sodium hydroxide solution are simultaneously introduced dropwise over the course of 1 hour with good stirring, at a temperature of 0° to 10°C, into a receiver which contains 300 ml of glycol monomethyl ether and 300 ml of ice water. Whilst doing so, the pH-value is kept at between 5 and 6 (correction with dilute sodium hydroxide solution or acetic acid). Thereafter the mixture is stirred for a further 10 hours at room temperature and is then warmed to 80°C for 1 hour and filtered. The filter cake is washed with 500 ml of methanol and 700 ml of water and is dried in vacuo at 50°C. The solvent fastness of the pigment obtained can be improved by stirring the pigment in 550 ml of 1,2-dichlorobenzene for 5 hours at 130°C, then filtering it off at 80°C, washing it with 500 ml of methanol and 500 ml of water and drying it as above. The red pigment dyestuff correspond to the formula

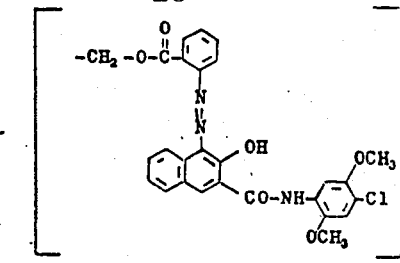

8 g of the dyestuff, which have been brought to a finely divided state by grinding in a vibration mill with 2 ml of xylene and 160 g of sodium chloride, and eluting the sodium chloride constituents, are dispersed in a stoving lacquer of 25 g of coconut oil alkyd resin (40% coconut oil), 10 g of melamine resin, 5 ml of toluene and 7 ml of glycol monomethyl ether in a ball mill. The mixture is applied to the substrate to be lacquered, the lacquer is cured for half an hour by stoving at 130°C, and brilliant red lacquerings having very good fastness to overlacquering and to light are obtained.

The diazo components and coupling components listed in the table which follows also yield valuable pigments, having the indicated colour shades, if a procedure analogous to Example 4 is followed.

| Diazo Component | Coupling Component | Colour Shade |
| --- | --- | --- |
| 1,1,1-Tris-(2'-aminobenzoyloxymethyl)-propane | 2-Hydroxy-5-naphthoic acid anilide | Yellowish-tinged red |
| 1,1,1-Tris-(2'-aminobenzoyloxymethyl)-propane | 2-Hydroxy-3-naphthoic acid (2'-methyl-4'-chloro)-anilide | Red |
| 1,1,1-Tris-(2'-aminobenzoyloxymethyl)-propane | 2-Hydroxy-3-naphthoic acid (2',5'-dimethoxy-4'-chloro)-anilide | Red |
| 1,1,1-Tris-(2'-aminobenzoyloxymethyl)-propane | 2-Hydroxy-3-naphthoic acid (4'-acetylamino)-anilide | Red |
| 1,1,1-Tris-(2'-aminobenzoyloxymethyl)-propane | 1-Acetoacetylamino-4-acetylamino-benzene | Greenish-tinged yellow |
| 1,1,1-Tris-(2'-aminobenzoyloxymethyl)-propane | 2-Hydroxy-3-naphthoic acid (4'-ethoxy)-anilide | Red |
| 1,1,1-Tris-(2'-aminobenzoyloxymethyl)-propane | 2-Hydroxy-3-naphthoic acid (2'-methyl)-anilide | Red |
| 1,1,1-Tris-(2'-aminobenzoyloxymethyl)-ethane | 2-Hydroxy-3-naphthoic acid anilide | Yellowish-tinged red |
| 1,1,1-Tris-(2'-aminobenzoyloxymethyl)-ethane | 2-Hydroxy-3-naphthoic acid (4'-ethoxy)-anilide | Red |
| 1,1,1-Tris-(2'-aminobenzoyloxymethyl)-ethane | 2-Hydroxy-3-naphthoic acid (4'-acetylamino)-anilide | Red |
| 1,1,1-Tris-(2'-aminobenzoyloxymethyl)-ethane | 2-Hydroxy-3-naphthoic acid (2'-methyl-4'-chloro)-anilide | Yellowish-tinged red |
| 1,1,1-Tris-(2'-aminobenzoyloxymethyl)-ethane | 2-Hydroxy-3-naphthoic acid (2',5'-dimethoxy-4'-chloro)-anilide | Red-brown |
| 1,1,1-Tris-(2'-aminobenzoyloxymethyl)-ethane | 2-Hydroxy-3-naphthoic acid (2'-methyl)-anilide | Red |
| 1,1,1-Tris-(2'-aminobenzoyloxymethyl)-ethane | 2-Hydroxy-3-naphthoic acid (2'-methoxy-4'-chloro-5'-methyl)-anilide | Yellowish-tinged red |
| 1,1,1-Tris-(2'-aminobenzoyloxymethyl)-ethane | 2-Hydroxy-3-naphthoic acid naphthyl-(1')-amide | Red |
| 1,1,1-Tris-(2'-aminobenzoyloxymethyl)-ethane | 1-Phenyl-3-methyl-5-pyrazolone | Yellow |
| 1,1,1-Tris-(2'-aminobenzoyloxymethyl)-ethane | 1-Phenyl-5-pyrazolone-3-carboxylic acid amide | Yellow |
| 1,1,1-Tris-(2'-aminobenzoyloxymethyl)-ethane | 2,6-Dihydroxy-3-cyano-4-methyl-pyridone | Yellow |
| Tris-(2'-aminobenzoyloxyethyl)-amine | 2-Hydroxy-3-naphthoic acid anilide | Carmine |
| Tris-(2'-aminobenzoyloxyethyl)-amine | 2-Hydroxy-3-naphthoic acid (4'-acetylamino)-anilide | Red |
| Tris-(2'-aminobenzoyloxyethyl)-amine | 2-Hydroxy-3-naphthoic acid (4'-ethoxy)-anilide | Yellowish-tinged red |
| Tris-(2'-aminobenzoyloxyethyl)-amine | 2-Hydroxy-3-naphthoic acid (2'-methyl-4'-chloro)-anilide | Yellowish-tinged red |
| Tris-(2'-aminobenzoyloxyethyl)-amine | 2-Hydroxy-3-naphthoic acid (2'-methyl)-anilide | Yellowish-tinged red |

-continued

| Diazo Component | Coupling Component | Colour Shade |
|---|---|---|
| Tris-(2'-aminobenzoyloxyethyl)-amine | 2-Hydroxy-3-naphthoic acid (2',5'-dimethoxy-4'-chloro)-anilide | Orange |
| Tris-(2'-aminobenzoyloxyethyl)-amine | 2-Hydroxy-3-naphthoic acid (2'-methoxy-4'-chloro-5'-methyl)-anilide | Orange |
| Tris-(2'-aminobenzoyloxyethyl)-amine | 1-Acetoacetylamino-4-acetylamino-benzene | Greenish-tinged yellow |
| 1,1,1-Tris-(3'-amino-4'-methoxybenzoyloxymethyl)-propane | 2-Hydroxy-3-naphthoic acid anilide | Bluish-tinged red |
| 1,1,1-Tris-(3'-amino-4'-methoxybenzoyloxymethyl)-propane | 2-Hydroxy-3-naphthoic acid (4'-acetylamino)-anilide | Bluish-tinged red |
| 1,1,1-Tris-(3'-amino-4'-methoxybenzoyloxymethyl)-propane | 2-Hydroxy-3-naphthoic acid (2'-methyl)-anilide | Bluish-tinged red |
| 1,1,1-Tris-(3'-amino-4'-methoxybenzoyloxymethyl)-propane | 2-Hydroxy-3-naphthoic acid (4'-ethoxy)-anilide | Bluish-tinged red |
| 1,1,1-Tris-(3'-amino-4'-methoxybenzoyloxymethyl)-propane | 2-Hydroxy-3-naphthoic acid (2'-methyl-4'-chloro)-anilide | Bluish-tinged red |
| 1,1,1-Tris-(3'-amino-4'-methoxybenzoyloxymethyl)-propane | 1-Acetoacetylamino-4-acetylamino-benzene | Greenish-tinged yellow |
| 1,1,1-Tris-(3'-amino-4'-methoxybenzoyloxymethyl)-ethane | 2-Hydroxy-3-naphthoic acid (2'-methyl-4'-chloro)-anilide | Carmine |
| 1,1,1-Tris-(3'-amino-4'-aminobenzoyloxymethyl)-ethane | 2-Hydroxy-3-naphthoic acid (4'-acetylamino)-anilide | Red |
| 1,1,1-Tris-(3'-methyl-4'-aminobenzoyloxymethyl)-propane | 2-Hydroxy-3-naphthoic acid (2',5'-dimethoxy-4'-chloro)-anilide | Claret |
| 1,1,1-Tris-(3'-methyl-4'-aminobenzoyloxymethyl)-propane | 2-Hydroxy-3-naphthoic acid (2'-methyl)-anilide | Red |
| 1,1,1-Tris-(3'-methyl-4'-aminobenzoyloxymethyl)-propane | 2-Hydroxy-3-naphthoic acid naphthyl-(1')-amide | Carmine |
| 1,1,1-Tris-(3'-methyl-4'-aminobenzoyloxymethyl)-propane | 1-Acetoacetylamino-4-acetylamino-benzene | Greenish-tinged yellow |
| 1,1,1-Tris-(3'-methyl-4'-aminobenzoyloxymethyl)-propane | 2-Hydroxy-3-naphthoic acid anilide | Red |
| 1,1,1-Tris-(3'-methyl-4'-aminobenzoyloxymethyl)-propane | 2-Hydroxy-3-naphthoic acid (4'-ethoxy)-anilide | Red |
| 1,1,1-Tris-(3'-methyl-4'-aminobenzoyloxymethyl)-propane | 2-Hydroxy-3-naphthoic acid (4'-acetylamino)-anilide | Claret |
| 1,1,1-Tris-(3'-methyl-4'-aminobenzoyloxymethyl)-propane | 2-Hydroxy-3-naphthoic acid (2'-methyl-4'-chloro)-anilide- | Red |

EXAMPLE 5

45 g of the dyestuff acid which is obtained by coupling diazotised 3-amino-4-chlorobenzoic acid to 2-hydroxy-3-naphthoic acid (4'-ethoxy)-anilide are dissolved in 650 ml of 1,2-dichlorobenzene. If necessary, the last traces of moisture are removed by azeotropic distillation in vacuo. 15 g of thoinyl chloride are added dropwise over the course of 1 hour at 130°C, whilst stirring, and the mixture is stirred for a further 2 hours at this temperature until the evolution of gas (SO$_2$/HCl) has ceased. It is then allowed to cool to 50°C, excess thionyl chloride is removed by applying a waterpump vacuum and thereafter 3.88 g of 1,1,1-tris-hydroxymethylpropane and 9 g of dry pyridine are successively added to the solution of the dyestuff-carboxylic acid chloride. The mixture is stirred for 1 hour at 50°C, then warmed to 130°C over the course of 1 hour and stirred for a further 5 hours at this temperature. The pigment which has precipitated is filtered off at 80°C, successively washed with 200 ml of 1,2-dichlorobenzene at 80°C, 100 ml of cold 1,2-dichlorobenzene, 250 ml of methanol and 250 ml of water and dried in vacuo at 50°C. The pigment corresponds to the formula

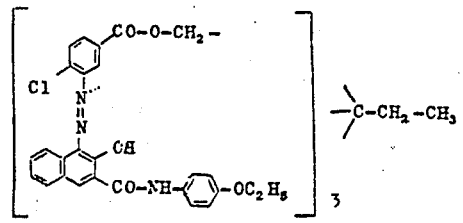

A printing ink manufactured by grinding 35 g of the above dyestuff, brought to a finely divided state, and 65 g of linseed oil and adding 1 g of drier (Co naphthenate, 50% strength in white spirit) yields yellowish-tinged red offset prints of high brilliance and colour strength and good fastness to light and very good fastness to lacquering. The use of this printing ink in letterpress printing, collotype printing, lithographic printing or dye stamping leads to yellowish-tinged red prints of similar fastness properties.

Analogously to Example 5, the diazo components and coupling components listed in the table which follows, after conversion into the dyestuff-carboxylic acid chloride and reaction with the trihydroxy compound also mentioned, also yield valuable pigments having the indicated colour shades. In some cases it proved advisable to isolate the dyesturr-carboxylic acid chloride before the reaction with trihydroxy compound. The pigment dyestuffs mentioned can, of course, also be manufactured according to the procedure according to Example 4.

| Diazo Component | Coupling Component | Trihydroxy Compound | Colour Shade |
|---|---|---|---|
| 4-chloro-3-amino- | 2-Hydroxy-3-naphthoic acid anilide | 1,1,1-Tris-hydroxy- | Red |
| " | 2-Hydroxy-3-naphthoic acid (2'-methyl)-anilide | " | Red |
| " | 2-Hydroxy-3-naphthoic acid (2'-methyl-4'-chloro)-anilide | " | Red-brown |
| " | 2-Hydroxy-3-naphthoic acid (4'-acetyl-amino)-anilide | " | Red |
| " | 1-Acetoacetylamino-4-acetylamino-benzene | " | Yellow |
| " | 2-Hydroxy-3-naphthoic acid (2',5'-dimethoxy-4'-chloro)anilide | " | Red |
| " | 2-Hydroxy-3-naphthoic acid (4'-acetyl-amino)-anilide | 1,1,1-Tris-hydroxy-methyl-ethane | Red |
| " | 2-Hydroxy-3-naphthoic acid (2'-methoxy)-anilide | " | Red |
| " | 1-(4'-Methylphenyl)-3-methyl-5-pyrazolone | " | Yellow |
| 4-Methoxy-3-amino-benzoic acid | 2-Hydroxy-3-naphthoic acid (2'-methyl-4'-chloro)-anilide | 1,1,1-Tris-hydroxy-methyl-propane | Bluish-tinged red |
| " | 2-Hydroxy-3-naphthoic acid (4'-chloro)-anilide | " | Red |

EXAMPLE 6

18.2 g of 1,1,1-tris-(2'-amino-5'-nitrobenzoyloxymethyl)-propane are introduced over the course of 2 hours, at 0°C, into a mixture of 55 ml of concentrated sulphuric acid and 30 g of 39.9% strength nitrosylsulphuric acid. The mixture is stirred for a further 4 hours at 0°C, poured out onto 500 g of ice and clarified, and excess nitrite is destroyed with aqueous amidosulphonic acid. If necessary, the temperature of the solution is kept at 0°C by throwing in ice.

The tris-diazonium salt solution thus produced is introduced dropwise, simultaneously with a solution of 29.5 g of 2-hydroxy-3-naphthoic acid (4'-acetylamino)-anilide, 1 g of alkylsulphonate and 7 ml of 45% strength sodium hydroxide solution in 400 ml of glycol monomethyl ether, over the course of 1 hour at 0°C into a receiver which contains 500 ml of ice water. Whilst doing so, the pH value of the coupling mixture is kept at between 4 and 6 by introducing solid hydrated sodium acetate and the temperature is kept at 0°C by throwing in ice. Thereafter the mixture is stirred for a further 12 hour at room temperature and is then warmed to 80°C for 1 hour and filtered. The filter cake is washed with 500 ml of methanol and 500 ml of water and is dried in vacuo at 50°C.

If desired, the solvent fastness of the pigment thus obtained is improved by stirring the pigment in 500 ml of 1,2-dichlorobenzene for 5 hours at 130°C, filtering it off, washing it with 1,2-dichlorobenzene, methanol and water and drying it as above. The pigment corresponds to the formula

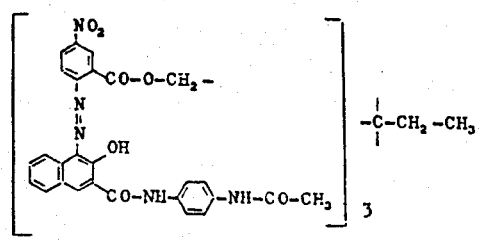

A mixture of 65 g of polyvinyl chloride, 35 g of diisooctyl phthalate, 2 g of dibutyl-tin mercaptide, 0.5 g of titanium dioxide and 0.5 g of the above pigment, which has been brought to a finely divided state by grinding with sodium chloride, is pigmented on a mixing mill at 165°C. A bluish-tinged red composition is obtained, which can be used for the manufacture of films or mouldings. The brilliant dyeing is distinguished by good fastness to light and very good fastness to migration.

Pigments with similar properties are obtained if, in the preceding example, the coupling component is replaced by 2-hydroxy-3-naphthoic acid (4'-ethoxy)-anilide (red), 2-hydroxy-3-naphthoic acid (2'-methyl-4'-chloro)-anilide (red) or 1-acetylamino-4-acetoacetylaminobenzene (yellow).

We claim:
1. Polyazo dyestuff of the formula

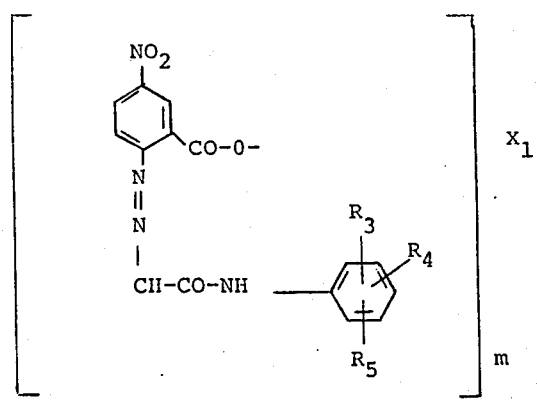

wherein $X_1$ is

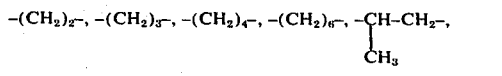

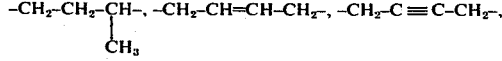

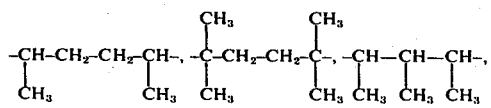

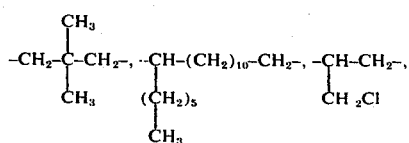

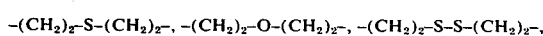

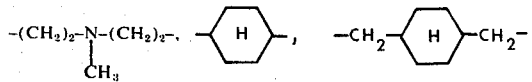

-continued

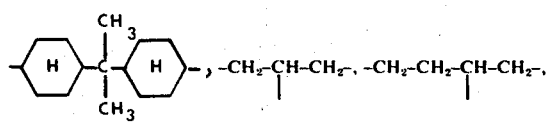

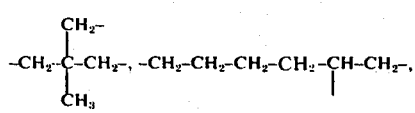

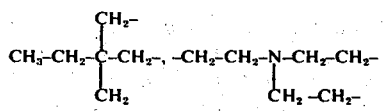

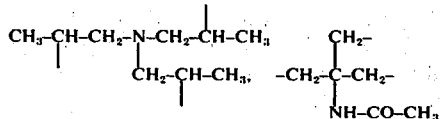

phenylene, naphthylene, diphenylene, chloronaphthalene, chlorophenylene, chlorodiphenylene, methylphenylene, methylnaphthalene, methyldiphenylene, or

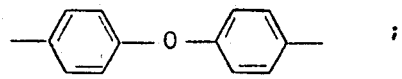 ;

$R_3$ and $R_4$, independently of each other, are hydrogen, alkyl of 1–4 carbon atoms, alkoxy of 1–4 carbon atoms, chloro, bromo, alkylcarbonylamino of 2–5 carbon atoms, alkoxycarbonyl of 2–5 carbon atoms, phenoxy, nitro, cyano, trifluoromethyl, carbamyl, phenylcarbonylamino, phenyloxamido, phenylcarbamyl, or any of said last three radicals which is further substituted by chloro, bromo, alkyl of 1–2 carbon atoms or alkoxy of 1–2 carbon atoms, $R_5$ is hydrogen, chloro, bromo, alkyl of 1–2 carbon atoms or alkoxy of 1–2 carbon atoms, and $m$ if 2 or 3.

* * * * *